United States Patent
Brinkman et al.

(10) Patent No.: US 10,279,385 B2
(45) Date of Patent: May 7, 2019

(54) ALUMINUM COMPOSITE MATERIAL AND FORMING METHOD

(71) Applicants: Henk-Jan Brinkman, Bonn (DE); Stefan Keller, Bonn (DE); Olaf Engler, Bonn (DE); Natalie Hörster, Köln (DE); Dietmar Schröder, Grevenbroich (DE); Holger Aretz, Mayschoß (DE)

(72) Inventors: Henk-Jan Brinkman, Bonn (DE); Stefan Keller, Bonn (DE); Olaf Engler, Bonn (DE); Natalie Hörster, Köln (DE); Dietmar Schröder, Grevenbroich (DE); Holger Aretz, Mayschoß (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 15/821,528

(22) Filed: Nov. 22, 2017

(65) Prior Publication Data
US 2018/0093314 A1 Apr. 5, 2018

Related U.S. Application Data

(60) Division of application No. 14/696,809, filed on Apr. 27, 2015, now Pat. No. 9,855,592, which is a (Continued)

(30) Foreign Application Priority Data

Oct. 30, 2012 (EP) .................................. 12190672

(51) Int. Cl.
B32B 15/01 (2006.01)
B21D 22/20 (2006.01)
(Continued)

(52) U.S. Cl.
CPC ......... B21D 22/208 (2013.01); B21D 22/203 (2013.01); B21D 35/005 (2013.01);
(Continued)

(58) Field of Classification Search
None
See application file for complete search history.

(56) References Cited

U.S. PATENT DOCUMENTS

| 6,224,992 B1 | 5/2001 | Delbeke et al. |
| 6,253,588 B1 | 7/2001 | Rashid et al. |
| 6,329,075 B1 * | 12/2001 | Nener ...................... B23K 1/19 148/523 |

FOREIGN PATENT DOCUMENTS

| CN | 1238391 A | 12/1999 |
| CN | 1486228 A | 3/2004 |

(Continued)

*Primary Examiner* — Daniel J. Schleis
(74) *Attorney, Agent, or Firm* — Reinhart Boerner Van Deuren P.C.

(57) ABSTRACT

The invention relates to a method for forming an aluminium composite material which has a core alloy made from an aluminium alloy of type AA5xxx or AA6xxx and at least one outer aluminium alloy layer provided on one or both sides, wherein the aluminium composite material is formed and the outer aluminium alloy layer provided on one or both sides has a yield strength $R_{p0.2}$ of 25 MPa to 60 MPa in the soft or solution-annealed state. The method enables the production of large-surface, heavily formed aluminium alloy sheet metal parts, in particular also in outer skin quality.

11 Claims, 10 Drawing Sheets

Related U.S. Application Data continuation of application No. PCT/EP2013/072744, filed on Oct. 30, 2013.

(51) Int. Cl.
*C22C 21/00* (2006.01)
*C22C 21/02* (2006.01)
*C22C 21/06* (2006.01)
*C22C 21/08* (2006.01)
*B21D 35/00* (2006.01)

(52) U.S. Cl.
CPC .......... *B32B 15/011* (2013.01); *B32B 15/016* (2013.01); *C22C 21/00* (2013.01); *C22C 21/02* (2013.01); *C22C 21/06* (2013.01); *C22C 21/08* (2013.01); *Y10T 428/12764* (2015.01)

(56) References Cited

FOREIGN PATENT DOCUMENTS

| | | |
|---|---|---|
| CN | 102400001 A | 4/2012 |
| EP | 0 949 344 B1 | 9/2002 |
| EP | 1 852 251 A1 | 11/2007 |
| EP | 2 156 945 A1 | 2/2010 |
| EP | 2 570 257 A1 | 3/2013 |
| FR | 2 922 222 A1 | 4/2009 |
| JP | 2002-86293 A | 3/2002 |
| JP | 2009-535508 A | 10/2009 |
| JP | 2011-530657 A | 12/2011 |
| JP | 2012-513539 A | 6/2012 |
| JP | 2014-528031 A | 10/2014 |
| RU | 2 270 098 C1 | 2/2006 |
| WO | WO 2013/037918 A1 | 3/2013 |

\* cited by examiner

ALUMINUM COMPOSITE MATERIAL AND FORMING METHOD

CROSS-REFERENCE TO RELATED PATENT APPLICATIONS

This patent application is a divisional of U.S. patent application Ser. No. 14/696,809, filed Apr. 27, 2015, which is currently pending, which is a continuation of PCT/EP2013/072744, filed Oct. 30, 2013, which claims priority to European Application No. 12 190 672.1, filed Oct. 30, 2012, the entire teachings and disclosure of which are incorporated herein by reference thereto.

FIELD OF THE INVENTION

The invention relates to a method for forming a metal sheet made from an aluminium composite material which has an aluminium core alloy of type AA5xxx or AA6xxx and at least one outer aluminium alloy layer provided on one or both sides, wherein the aluminium composite material is formed in a forming tool and the outer aluminium alloy layer provided on one or both sides has a yield strength $R_{p0.2}$ of 25 MPa to 60 MPa in the soft or solution-annealed state. In addition, the invention relates to a use of the aluminium composite material in a corresponding forming method as well as a formed sheet metal part consisting of this aluminium composite material.

BACKGROUND OF THE INVENTION

Sheet metal material made from AA6xxx aluminium alloys are used in cars in the body and for body attachments (doors, tailgates, bonnets, etc.). The alloys which are usually used, such as, for example, AA6016 or AA6014, show both a good formability in the delivered state (T4) and a significant increase in strength after the paint baking cycle, for example in the case of a cathodic dip painting. The sheet metal material is solution annealed in the T4 state. For components in the visible region, the so-called outer skin parts, a good surface appearance, i.e. a quality with little or no roping, is a further requirement that the aluminium alloys are used.

For components having high requirements on the formability, aluminium materials are available on the market which are optimised with respect to formability and at the same time can be used for outer skin parts. However, even these metal sheets which are optimised with respect to formability cannot solve new requirements on the formability. Presently, due to the weight saving potential of aluminium, aluminium solutions are sought after for outer skin components which could not be produced previously from aluminium. For example, large-surface side wall parts of a motor vehicle are produced as a single-part component from a single aluminium alloy metal sheet. Such large-surface components could not be produced previously due to the limited formability of the aluminium material. Due to the lack of aluminium solutions, these large-surface body components are either produced from steel or the component is designed as a multi-part aluminium component, which leads to an increased effort in production due to additional joining steps.

The applicant has developed a material which fulfils very high requirements on the formability and is distinguished by high strain values in the T4 state. This aluminium composite material has already been referred to in international patent application WO 2013/037918 A1. The production method of the material indeed targets a maximum formability of the material, however in practice roping effects were visible which are caused by production.

SUMMARY OF THE INVENTION

The object of the present invention is to extend the forming limits of aluminium alloys, in particular to extend the forming limits for the AA6xxx and AA5xxx aluminium alloys which are of interest for motor vehicle construction, and to provide a forming method which enables the production of large-surface, heavily formed aluminium alloy sheet metal parts, in particular also in outer skin quality. In addition, a use of an aluminium composite material is proposed and sheet metal parts which are produced accordingly are provided.

According to a first teaching of the present invention, the demonstrated object is solved by a method for forming a metal sheet made from an aluminium composite material in that:

$$k_{f,outside}/k_{f,core} < 0.5, \text{ preferably } k_{f,outside}/k_{f,core} < 0.4$$

applies for the ratio of the flow stress of the aluminium alloys of the core and the at least one outer layer in the soft-annealed or solution-annealed state, and that the frictional shear stress $\tau_R$ between the tool and the aluminium composite material in the contact surface reaches the shear flow stress $k_{outside}$ of the outer aluminium alloy layer at at least one local position in the forming tool during the formation of the aluminium composite material.

According to Coulomb's law of friction:

$$|\tau_R| = \min(k, \mu \cdot |P_N|)$$

applies for the frictional shear stress in the contact surface between the forming tool and the outer aluminium layer of the aluminium composite material, wherein $\tau_R$ represents the frictional shear stress, $\mu$ the coefficient of friction and $p_N$ the standard contact pressure or the surface pressure which generates the friction, and k the shear flow stress of the softer outer layer of the aluminium composite material.

With the function (1) referred to, two ranges result for the absolute value of the frictional shear stress:

$$\tau_R = \mu \cdot |P_N| \text{ where: } \mu \cdot |P_N| < k \text{ and} \qquad 1.)$$

$$\tau_R = k \text{ where } \mu \cdot |P_N| \geq k \qquad 2.)$$

In the simplest case, $\mu$ remains constant throughout the formation such that in the case of increasing surface pressure, the frictional shear stress $\tau_R$ increases linearly. If, however, $\tau_R$ reaches the shear flow stress k of the material which is in contact with the forming tool, then the frictional shear stress is limited to the shear flow stress k.

Now according to the theory according to Von Mises:

$$k = k_f / \sqrt{3},$$

applies for the shear flow stress k and the flow stress $k_f$ of a material to be formed, wherein $k_f$ corresponds to the yield strength $R_{p0.2}$ determined in the tensile test at 0.2% plastic strain.

The outer, soft aluminium alloy layer, the flow stress $k_{f,outside}$ of which and thus also the shear flow stress $k_{outside}$ of which is considerably lower than that of the aluminium core alloy $k_{f,core}$, is in contact with the forming tool. Thus, at least at one local position:

$$\tau_R = k_{outside}$$

applies for the frictional shear stress in contact between the forming tool and the aluminium composite material during the formation.

From this it is clear that the smaller the value $k_{outside}$ of the shear flow stress, with respect to the flow stress $k_{f,outside}$ of the outer aluminium alloy layer, the smaller the frictional force opposing the movement direction of the material in the tool. As a result, the sheet metal made from the aluminium composite material can be inserted into a deep drawing tool more easily in this case. This also applies to aluminium composite materials which are provided with an outer aluminium alloy layer on one side, provided that the softer, outer aluminium alloy layer is substantially in contact with the forming tool.

It was discovered that the claimed material combination consisting of an aluminium alloy of type AA5xxx or AA6xxx for the core alloy and a soft aluminium alloy layer provided on one or both sides which has a flow stress ratio with respect to the core alloy of smaller than 0.5, preferably smaller than 0.4, enables the frictional shear stress $\tau_R$ in the aluminium composite material to reach the shear flow stress $k_{outside}$ of the outer aluminium alloy layer at at least one local position during the formation of the aluminium composite material, and limits this there. A considerably improved formability of the aluminium composite material is hereby achieved in comparison to a monolithic metal sheet made from the core alloy.

Differently to in the applicant's own WO 2013/037918 A1, a completely new path is taken, as the present invention includes the influence of the frictional shear stress during formation to achieve the degree of forming in the technical teaching. Contrary to the previous approach, therein the effect is used that the frictional shear stress is limited by the shear flow stress of the softer, outer aluminium alloy layer.

In forming tests with a cross tool on a laboratory scale, it was shown that in the case of identical tool geometry and comparable lubricant conditions, the hold-down clamp forces could be increased by at least a factor of 2.6, provided that the ratio referred to above of the flow stress $k_{f,outside}/k_{f,core}$ of the aluminium alloys involved is adhered to. The higher possible hold-down clamp force in the cross tool tests suggest a considerably improved formability of the corresponding aluminium composite materials, in particular in a deep drawing process. As the shear flow stress of the softer outer layer is relatively low in comparison to the shear flow stress of the aluminium core alloy, the frictional shear stress during formation is significantly reduced, which enables a greater process window. This opens up the possibility, for example, to be able to produce a single-part side wall of a motor vehicle from aluminium in outer skin quality with an AA6xxx aluminium alloy, whereby a great potential for cost saving compared to a multi-part aluminium solution results.

The same also applies for the AlMg aluminium core alloys of type AA5xxx which are used substantially for inner parts and structural parts, such that even large-surface inner parts and structural parts which require a high degree of forming can be produced.

According to a further embodiment of the method, the formation comprises a deep drawing and/or stretch forming process. In these formation processes, the frictional shear stress $\tau_R$ complicates the relative movement between the sheet metal material and the forming tool. As has already been stated, the limitation of the frictional shear stress $\tau_R$ to the low values of the shear flow stress $k_{outside}$ of the softer, outer aluminium alloy layer leads to an improved deep drawing or stretch forming performance. Thus, a considerably higher degree of forming can be achieved, as the material can be drawn with lower forces in the formative forming tool.

If, according to a further embodiment of the method according to the invention, the at least one outer aluminium alloy layer preferably has 5% to 15% of the thickness of the entire aluminium composite material, then the technical effect of the method according to the invention can be used, without the strength of the aluminium composite material being reduced too much by the outer layers and the proportion thereof of the total thickness of the aluminium composite material.

Preferably, the frictional shear stress $\tau_R$ is enlarged during the formation by an increase of the surface pressure until this reaches the shear flow stress $k_{outside}$ of the outer aluminium alloy layer at at least one local position in the forming tool. Contrary to the previous forming method in which the surface pressure is typically selected to be so large that no wrinkling occurs in the tool, the surface pressure can, for example, be enlarged in order to achieve the advantageous effect of the aluminium composite material with regard to the extension of the forming limits. Furthermore, it is conceivable that composite materials having a more cost-efficient surface topography having higher frictional values can nevertheless be formed successfully. A more cost-efficient surface topography can, for example, be provided by a "mill finish" surface topography of the sheet metal, which saves a work step in the form of an additional rolling step for the application of the specific topography compared to the topography having lubricant pockets which are usually provided in the case of a large degree of forming.

Particularly good forming results were achieved according to a further embodiment of the method in that the aluminium alloy of type AA6xxx in the solution-annealed state or AA5xxx in the soft state has a uniform strain $A_g$ of at least 20%, preferably at least 22%. Examples of this are aluminium alloys of type AA6016 in the T4 state or the aluminium alloy AA5182 in the O state.

Furthermore, aluminium alloys of type AA6xxx having an elongation at break $A_{80mm}$ of at least 24%, preferably at least 26% transversely to the rolling direction are eligible as materials for the aluminium core alloys. They are suitable in an embodiment which is free of or low in roping, in particular also for outer skin components of a motor vehicle having visibility requirements for the surface appearance.

In addition, AlMg Aluminium core alloys of type AA5xxx having a uniform strain $A_g$ of at least 21%, preferably at least 22%, as well as an elongation at break $A_{80mm}$ of at least 25%, preferably at least 26% transversely to the rolling direction are eligible as structural parts which do not form visible components of a vehicle, therefore, for example, frame constructions, interior door parts, twist beam axles, etc.

The aluminium core alloys referred to above combine very high strengths with an already very good forming capability which can be considerably increased even further with the method according to the invention.

If an alloy of type AA6xxx is used as an aluminium alloy and an aluminium alloy of type AA8xxx is used as at least one outer aluminium alloy layer or an alloy of type AA5xx is used as an aluminium core alloy and an aluminium alloy of type AA8xxx, AA1xxx, AA5005, AA5005A is used as at least one outer aluminium alloy layer, then aluminium composite materials can be produced with established alloys which have extremely good forming properties.

In a particularly preferred embodiment, the aluminium core alloy is an alloy of type AA6016 and the at least one outer alloy layer is an alloy of type AA8079. This combination allows a hold-down clamp force in the cross tool tests referred to above which exceeds the monolithic AA6016 variant by more than a factor of 10. These improved forming properties are achieved in the cross tool not only in the case of an increase of the hold-down clamp force, but also in the case of an enlarged circular blank diameter.

If an aluminium composite material having an aluminium core alloy of type AA6xxx is formed according to a further embodiment of the method which has a thickness of 0.5 mm to 2.0 mm, preferably 0.8 mm to 1.5 mm, the strength requirements for outer skin parts which occur in motor vehicle construction can be fulfilled together with the increased requirements on the formability.

The same also applies for an aluminium core alloy of type AlMg6 and at least one outer aluminium alloy layer of type AA1050 or AA5005 or AA5005A. For all alloy combinations referred to, the flow stress ratio is $k_{f,outside}/k_{f,core} < 0.5$.

If an aluminium composite material having a core alloy of type AA5xxx, in particular AlMg6, is formed according to a further embodiment of the method, which has a thickness of 0.5 mm to 3.5 mm, preferably 1.0 mm to 2.5 mm, the strength requirements set for structural components for simultaneously improved formability can be fulfilled.

Both a roll cladding and a simultaneous casting can be used in the production of the aluminium alloy composite material. During the roll cladding, firstly a rolling ingot is cast from the aluminium core alloy material and is homogenised. Then the coating(s) with the core alloy is/are composed into a packet and is/are heated to the hot rolling temperature. Alternatively, the homogenisation can also occur after the packet construction. Subsequently, the heated packet is rolled hot and then cold to final thickness.

For the AA6xxx materials, the homogenisation of the rolling ingot occurs at a temperature of 500° C. to 600° C., preferably 550° C. to 580° C., for more than an hour. The hot rolling occurs, differently to in the applicant's own international patent application WO 2013/037918 A1, without hot strip quenching with winding temperatures from 300° C. to 400° C. and a typical thickness of 5 to 10 mm. For outer skin parts, a first cold rolling to 3 to 4 mm is then implemented with subsequent intermediate annealing, for example in the chamber furnace with a metal temperature of 370° C. to 450° C. for at least 1 h. Due to final solution annealing to final thickness at a typical temperature of approximately 500° C. to 570° C. with subsequent quenching and natural aging approximately at room temperature for at least three days, the strips can be supplied in the T4 state. Optionally, the strips undergo a heat treatment directly after the quenching in order to accelerate the hardening performance during the cathodic dip painting.

For the AA5xxx-based aluminium composite materials, intermediate annealing temperatures and soft annealing temperatures of 300° C. to 500° C. are used. Additionally, AA5xxx materials do not pass through a quenching procedure such that the final soft annealing can occur in the chamber furnace or in the continuous furnace. Alternatively, AA5xxx-based aluminium composite materials can also be used directly as a hot strip.

The aluminium alloys AA5182, AA5019, AlMg6, AA6016, AA6014, AA6022, AA6451, and AA 6111 are eligible as materials, for example for the core alloy layer. Aluminium alloys of type AA1xxx or AA8xxx, for example AA1050, AA1100, AA1200, AA8011, AA8014, AA8021 and in particular AA8079 are preferred as an outer aluminium alloy layer.

According to second teaching of the present invention, the object demonstrated above is solved by the use of an aluminium composite material which has a core alloy layer made from an aluminium alloy of type AA5xxx or AA6xxx and at least one outer aluminium alloy layer which is provided on one or both sides and which has a yield strength $R_{p0.2}$ of 25 MPa to 60 MPa in the soft or solution-annealed state, having a ratio of the flow stresses in the soft or solution-annealed state of $$K_{f,outside}/k_{f,core} < 0.5, \text{ preferably } k_{f,outside}/k_{f,core} < 0.4,$$

which is used in a forming method according to the invention. The use of the aluminium composite material in such a forming method in particular enables the provision of large-surface, single-part sheet metal parts for motor vehicle construction, either as an outer skin part having an AA6xxx core alloy or as a non-visible structural part having an AA5xxx core alloy, which require a particularly high degree of forming.

Finally, the object demonstrated above is solved according to a third teaching of the present invention by a sheet metal part which is formed, in particular is deep drawn or stretch formed, using the method according to the invention. As has already been stated, the method according to the invention enables large-surface sheet metal parts made from a single aluminium composite material to be provided and further work steps, such as, for example, the joining of smaller components which can be assembled into one unit, to be avoided. Thus, considerably larger and more complexly formed components can be made available.

According to a further embodiment, the sheet metal part is preferably a structural part or an outer skin part of a motor vehicle. For example, the sheet metal part can be a complex floor pan of a floor assembly or a side door interior part, for example if an aluminium core of type AA5xxx is used. Outer skin parts such as mudguards, bonnets and in particular side walls or frames can be provided with an aluminium composite material having an AA6xxx core alloy. All sheet metal parts referred to require a very high degree of forming which can be achieved with the forming method according to the invention combined with the specified aluminium composite materials. The possible applications of aluminium materials in the motor vehicle can thus be increased once again, as a forming performance which had previously not been achieved is available for these materials.

BRIEF DESCRIPTION OF THE DRAWINGS

Below the invention is explained in more detail by means of exemplary embodiments in connection with the drawing. In the drawing is shown.

DETAILED DESCRIPTION OF THE INVENTION

Figure 1:
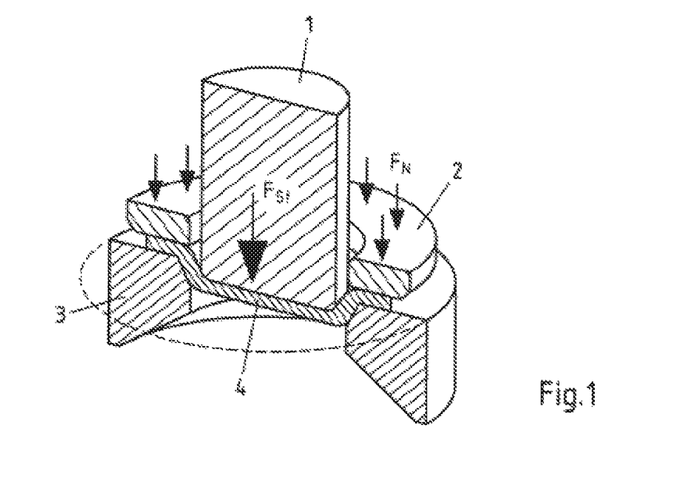
FIG. 1 is a schematic, perspective sectional depiction, the cross tool for the implementation of the deep drawing test.

In FIG. 1, firstly the configuration of the cross tool is depicted in a perspective sectional view, wherein the cross tool comprises a stamp 1, a hold-down clamp 2 and a matrix 3. The sheet 4, which was cladded on both sides in the case of a clad variant, had, for example, a thickness of 1.5 mm. This applied both for the clad and for the unclad variant. The sheet metal provided as a circular blank is deep drawn by the stamping force $F_{st}$, wherein the hold-down clamp 2 and the matrix 3 were pressed onto the sheet blank with the force $F_N$.

The cross-shaped stamp 1 had a width of 126 mm along each of the axes of the cross, whereas the matrix had an opening width of 129.4 mm. The sheet blank made from the aluminium material had different diameters. A circular blank diameter of 195 mm was started with.

Figure 2:
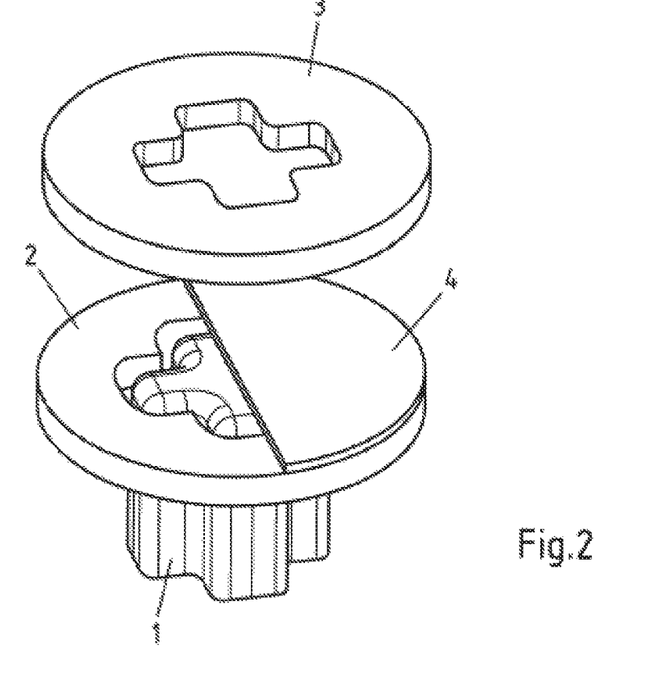
FIG. 2 is a simplified exploded depiction, the stamp, hold-down clamp and matrix of the cross tool from FIG. 1.

In FIG. 2, the stamp 1, the hold-down clamp 2 as well as the matrix 3 and the sheet 4 is depicted again in an exploded view from below. Stresses of the materials during industrial deep drawing tests can be copied with the cross tool and thus the forming performance of the material to be tested can be checked. Therein the stamp 1 was lowered in the direction of the metal sheet with a speed of 1.5 mm per second and the metal sheet 4 was deep-drawn according to the shape of the stamp. The stamping force and the stamp displacement until tearing of the sample were measured and recorded.

Figure 3:
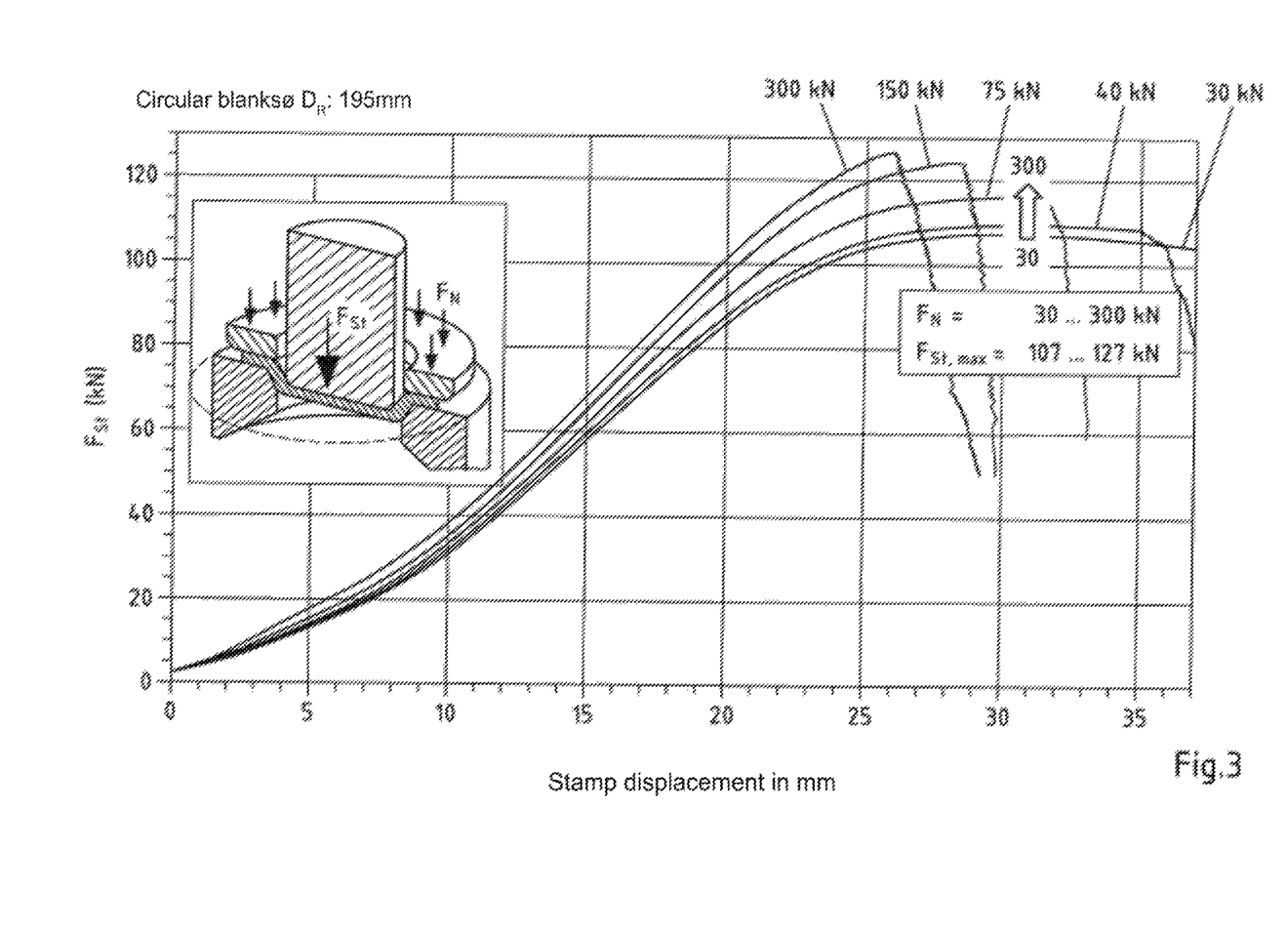
FIG. 3 is a diagram, the stamping force depending on the stamp displacement of the cross tool from FIG. 1 of a monolithic variant of type AA6016.

In FIG. 3, the force displacement diagram of the unclad variant having an aluminium alloy material of type AA6016 is depicted. It can be recognised that in the case of increase of the hold-down clamp forces from 30 to 300 kN, the stamping force increases to a value of more than 120 kN, provided at a 23 mm stamp displacement. The higher the hold-down clamp force, the earlier the stamping force increases. At a 26 mm stamp displacement and a hold-down clamp force of 300 kN, a tearing of the material occurs which limits the forming capability of the unclad variant. If the hold-down clamp force is reduced, the stamp displacement increases to approximately 35 mm at 75 kN hold-down clamp force until the material tears. No tearing of the material occurs at 30 kN.

The conventional method to adjust the hold-down clamp force and thus the friction in the deep drawing process can be seen by means of FIG. 3. The person skilled in the art will attempt to keep the hold-down clamp forces as low as possible such that a tearing of the material does not occur. On the other hand, the person skilled in the art will endeavour to adjust the hold-down clamp forces such that a wrinkling does not occur. The forming process is, however, limited by the occurrence of tears with the given hold-down clamp force.

Figure 4:
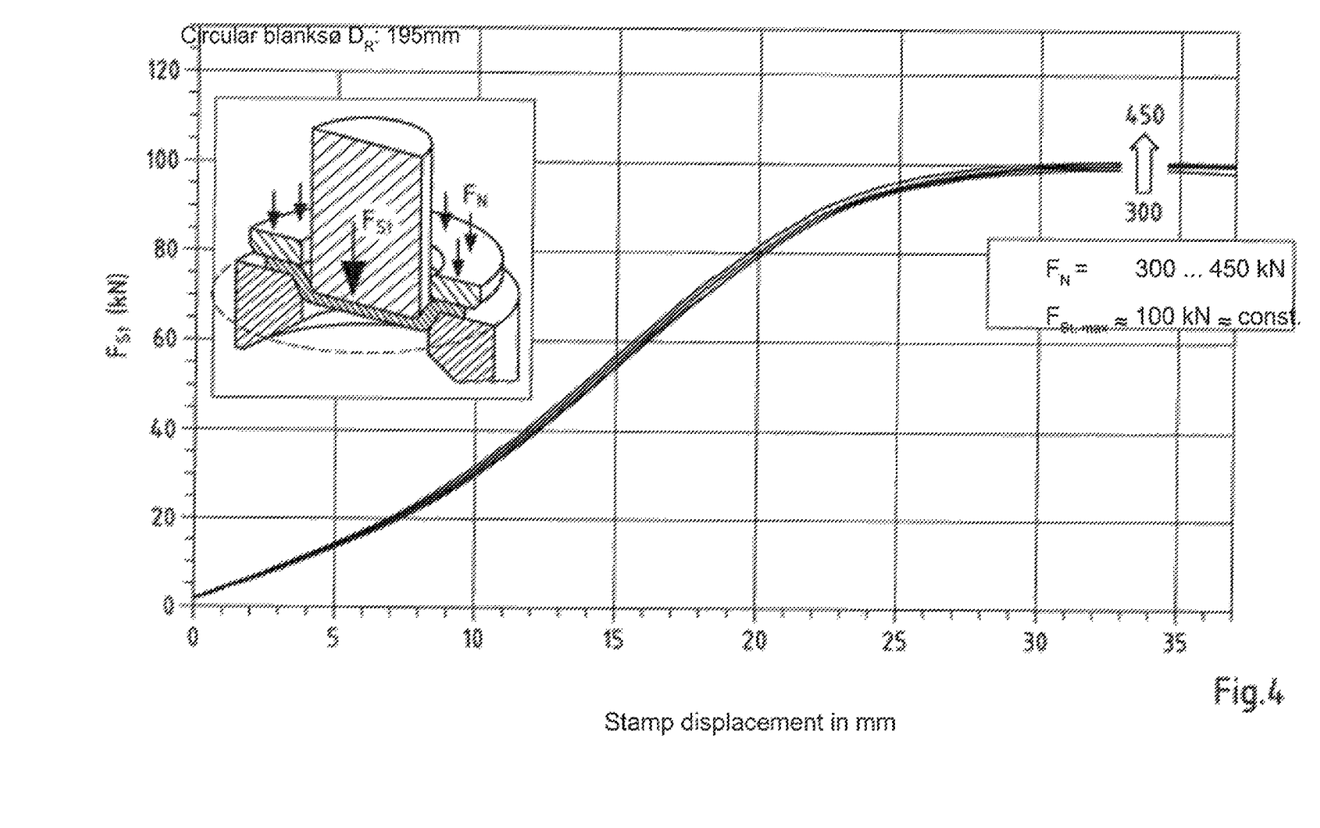
FIG. 4 is the diagram from FIG. 3 for implementation of an exemplary embodiment of the forming method according to the invention.

FIG. 4 now shows the force displacement diagram for the stamping force according to one exemplary embodiment of the forming method according to the invention, wherein the sheet metal material is a variant of type A2-K1-A2 which is clad on both sides. The composition both of the unclad variant of type AA6016 depicted in FIG. 3 and the corresponding variant which is clad on both sides from the diagram in FIG. 4 are depicted in Table 1.

In FIG. 4 it is recognised that the stamping force $F_{st}$ is limited to a maximum of 100 kN, independently of the respective hold-down clamp force $F_N$, which was varied from 300 to 450 kN. No tears were shown in the case of the forming method according to the invention. The material could also be deep drawn without tears at hold-down clamp forces of over 300 kN with a stamp displacement of more than 35 mm. This means that during the forming, the frictional shear stress of the material which acts against the stamping force $F_{st}$ is limited and indeed to the value of the shear flow stress of the outer aluminium alloy layer. Even at the maximum stamping force of 450 kN, no tearing of the aluminium composite material of the A2-K1-A2 variant results.

The tested aluminium composite materials were produced as follows:

A rolling ingot consisting of an aluminium alloy of type AA 6016 having the composition specified in Table 1 was cast, homogenised at 580° C. for more than 2 h and covered on both sides with a cladding material of alloys A1 A2, A3, A4 and subsequently roll cladded. Therein, the hot strip having a thickness of 12 mm and a hot rolling final temperature of at least 300° C. was produced. Subsequently the hot strip was annealed at a strip temperature of 350° C. for more than 2 h and cold rolled to 4 mm. To achieve an outer skin quality, i.e. to avoid the so-called roping, an intermediate annealing occurred at this thickness, wherein the strip had a temperature of approximately 350° C. for 2 h. Subsequently, the strip made from aluminium composite material was cold rolled to 1.5 mm final thickness and underwent a solution annealing at 500° C. to 570° C. with quenching such that the aluminium alloy strips having the core alloy K1 were present in the T4 state for the later tests after natural aging at room temperature for approx. 2 weeks.

The aluminium composite materials based on an AlMg6 aluminium core were produced as follows: homogenisation of an ingot made from an AlMg6 alloy at 500° C. to 550° C. for more than 2 h, construction of the cladding rolling ingot by coating of the cladding materials on both sides, subsequent roll cladding to 12 mm thickness, implementation of a hot strip annealing at 350° C. for more than 2 h, cold rolling to 4 mm thickness, intermediate annealing of the cold strip at 350° C. for more than 2 h and subsequent cold rolling to 1.5 mm final thickness. Instead of the solution annealing, a soft annealing is implemented in the chamber furnace at 350° C. for 2 hours at the end of the production process.

TABLE 1

| Alloy | Designation | Si | Fe | Cu | Mn | Mg | Ti |
|---|---|---|---|---|---|---|---|
| AA 1050 | A1 | 0.046 | 0.32 | 0.0034 | 0.0057 | 0.0036 | 0.0149 |
| AA 8079 | A2 | 0.089 | 0.86 | 0.0019 | 0.021 | 0.0022 | 0.0061 |

TABLE 1-continued

| Alloy | Designation | Si | Fe | Cu | Mn | Mg | Ti |
|---|---|---|---|---|---|---|---|
| AA 6463A | A3 | 0.25 | 0.21 | 0.0014 | 0.078 | 0.34 | 0.016 |
| AA 5005 | A4 | 0.066 | 0.19 | 0.119 | 0.121 | 0.89 | 0.0039 |
| AA 6016 | K1 | 1.31 | 0.18 | 0.016 | 0.078 | 0.32 | 0.0166 |
| AlMg6 | K2 | 0.091 | 0.2 | 0.142 | 0.25 | 6.05 | 0.022 |

Table 1 shows the different alloy content of the substantial alloy components in percentage by weight. All six alloys have, besides aluminium and the specified alloy components Si, Fe, Cu, Mn, Mg and Ti, impurities which amount individually to a maximum of 0.05% by weight and in total to a maximum of 0.15% by weight. All information in Table 1 is, of course, understood to likewise be in % by weight.

In Table 2, the measured mechanical characteristic values of the used alloy types are documented. All information was determined in the soft or solution-annealed state according to DIN EN ISO 6892-1:2009.

TABLE 2

| Alloy | Reference | $R_{p0.2}$ MPa | $R_m$ MPa | $A_g$ % | $A_g$ (smoothed) % | $A_{80mm}$ % | $A_{80mm}$ (hand) % | $n_{4-6'}$ value | $r_{8-12'}$ value |
|---|---|---|---|---|---|---|---|---|---|
| AA 1050 | A1 | 26 | 74 | 27.9 | 28.7 | 38.6 | 39.4 | 0.270 | 1.180 |
| AA 8079 | A2 | 29 | 81 | 31.1 | 31.4 | 46.0 | 46.9 | 0.253 | 0.685 |
| AA 6463A | A3 | 37 | 99 | 21.3 | 22.5 | 27.4 | 28.3 | 0.321 | 0.816 |
| AA 5005 | A4 | 45 | 113 | 24.7 | 24.0 | 30.2 | 31.1 | 0.243 | 0.941 |
| AA 6016 | K1 | 114 | 219 | 24 | 23.8 | 29.5 | 29.8 | 0.277 | 0.729 |
| AlMg6 | K2 | 156 | 308 | 23 | 22.2 | 25.9 | 26.9 | 0.301 | 0.676 |

In a further test, the maximum hold-down clamp forces for different alloy combinations were determined with different circular blank diameters. It was shown that, in particular for the A2-K1-A2 variant, which represents an aluminium alloy of type AA6016 clad on both sides with an aluminium alloy layer of type AA8079, the circular blank diameter could be enlarged further and tears only occurred at a circular blank diameter of 205 mm and a maximum hold-down clamp force of more than 105 kN. At circular blank diameters of 195 mm or 200 mm, no tears could be generated even at the maximum possible hold-down clamp force of 600 kN in the forming test. As the monolithic variant already had tears at a circular blank diameter of 195 mm and a maximum hold-down clamp force of 50 kN, this proves the excellent formability of the clad variant in the forming method according to the invention. The results of the cross tool test are summarised in Table 3.

$R_{p0.2}$ corresponds to the value of $k_f$ at 0.2% plastic strain and is measureable in the tensile test. In Table 3, additionally the ratio $k_{f,outside}/k_{f,core}$ is entered for a true strain of approx. 0.025 which is gleaned from FIGS. 5 to 9 for the respective material combination.

TABLE 3

| Variant | Ratio $R_{p0.2,outside}/R_{p0.2,core}$ | Ratio $k_{f,outside}/k_{f,core}$ (true strain approx. 0.025) | | Max. hold-down clamp force at circular blank diameter | | |
|---|---|---|---|---|---|---|
| | | | | 195 mm F(kN) | 200 mm F(kN) | 205 mm F(kN) |
| K1 unclad | — | — | Comparison | 50 | | |
| A1-K1-A1 | 0.23 | 0.34 | Invention | 159 | | |
| A2-K1-A2 | 0.25 | 0.38 | Invention | >600 | >600 | 105.0 |
| A3-K1-A3 | 0.32 | 0.46 | Invention | 130 | | |
| A4-K1-A4 | 0.39 | 0.53 | Comparison | 60 | | |
| K2 unclad | — | — | Comparison | 75 | | |
| A1-K2-A1 | 0.17 | 0.27 | Invention | >600 | | |
| A4-K2-A4 | 0.29 | 0.45 | Invention | >600 | | |

The clad aluminium alloy variants A1-K1-A1 and A3-K1-A3 likewise showed a clear increase with regard to the maximum hold-down clamp force at a circular blank diameter of 195 mm. In comparison to the unclad K1 variant, the maximum hold-down clamp force which amounted to 50 kN for the unclad K1 variant increased by a factor of 2.6 (A3-K1-A3 variant) or by a factor of 3.18 (A3-K1-A3 variant). On the other hand, the A4-K1-A4 variant enabled no significant increase of the maximum hold-down clamp force compared to the unclad K1 variant.

The measured values depicted in FIGS. 5 to 9 were determined by tensile test transversely to the roll direction according to DIN EN ISO 6892-1:2009. The flow stress $k_f$ is depicted depending on the true strain, wherein the true strain results as follows:

$$\varphi = \ln(1+\epsilon)$$

wherein φ indicates the true strain and ε the technical strain.

Figure 5:
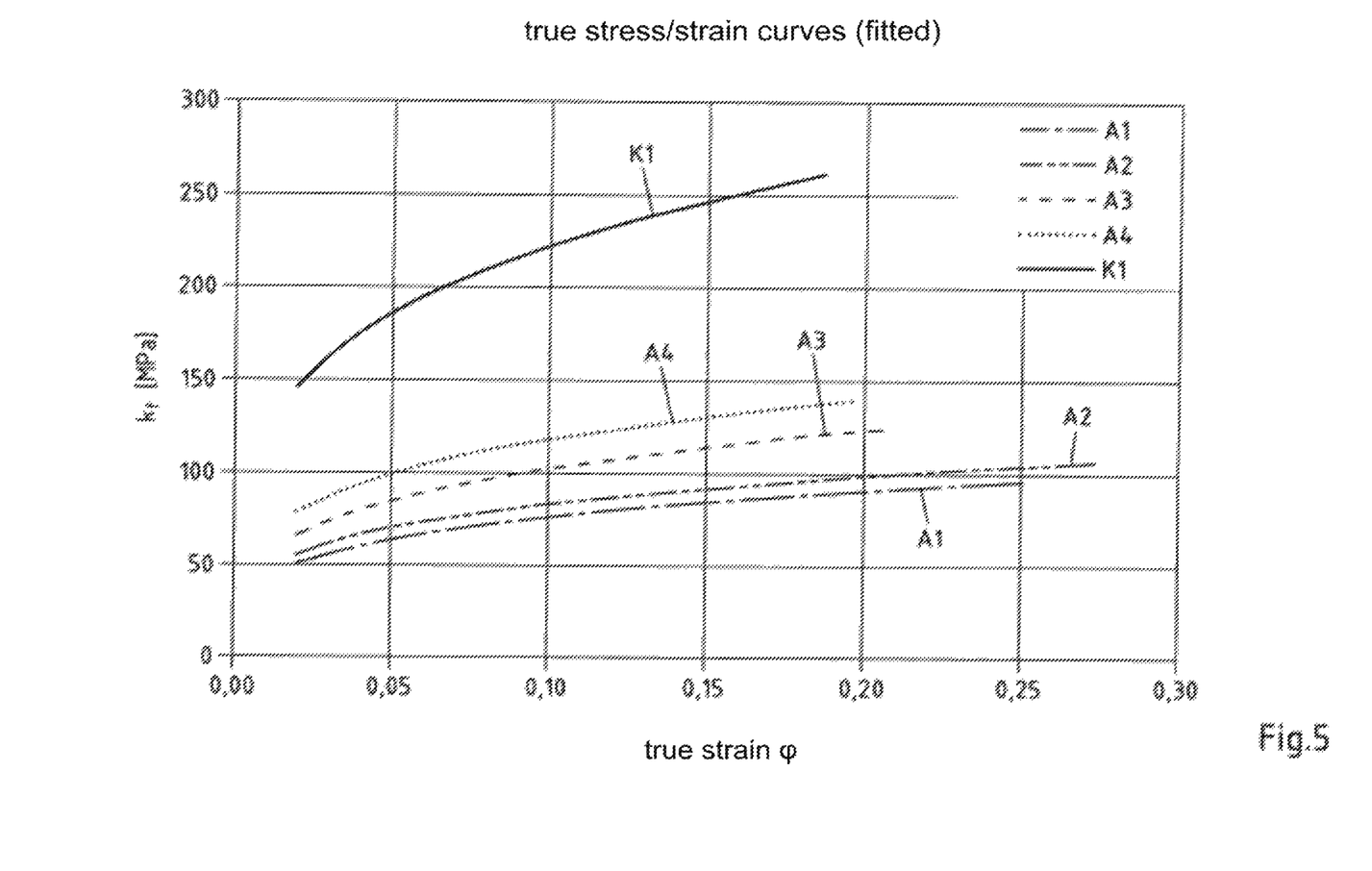
FIG. 5 is a diagram, flow stresses $k_f$ determined from a tensile test, depending on the strain for the materials AA6016, AA5005, AA6463A, AA8079, AA1050.

To explain, FIG. 5 shows stress-strain curves for different materials, wherein the flow stress $k_f$ is applied compared to the true stress φ. It can be recognised in FIG. 5 that the core material K1 has a considerably higher flow stress than the outer cladding layers A1, A2, A3 and A4.

Figure 6:
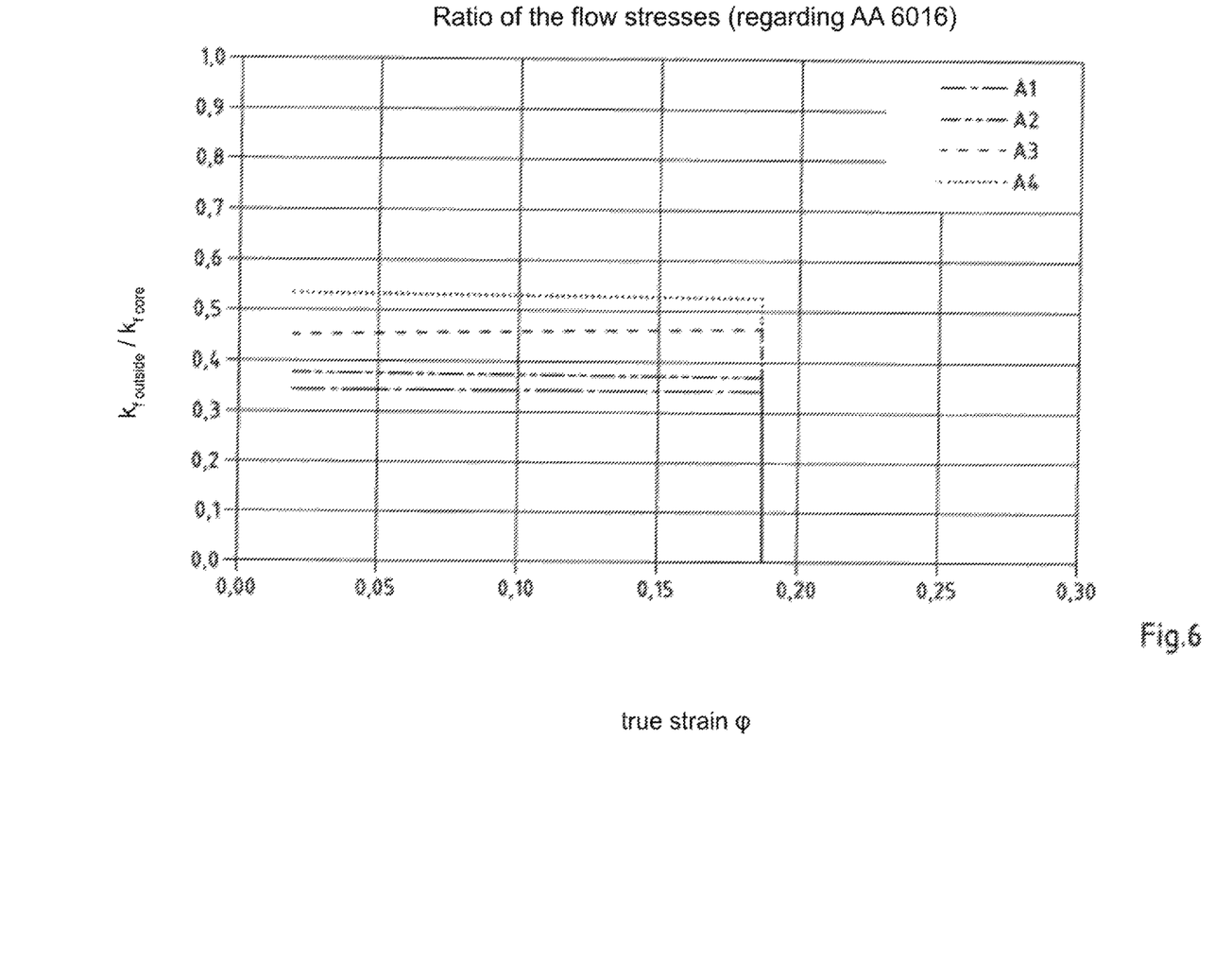
FIG. 6 shows the flow stresses of the aluminium materials AA1050, AA8079, AA6463A, AA5005 in relation to the flow stress of the aluminium alloy AA6016.

In FIG. 6, the ratios of the flow stresses of the outer aluminium alloy layers are depicted in relation to the flow stress of the core alloy layer K1. All variants A1, A2 and A3 have a ratio of $k_{f,outside}/k_{f,core}$ of less than 0.5. Only the variant A4, an outer aluminium alloy layer of type AA5005, has a flow stress ratio to an aluminium alloy of type AA6016 which is greater than 0.5.

The measured, maximum holding forces for a circular blank diameter of 195 mm show that the softer the outer aluminium alloy layer, the greater the maximum hold-down clamp forces for constant circular diameter. As the deep draw test is a plastic deformation, the solidification of the outer aluminium alloy layer also plays a role, however.

A distinctive effect with respect to the enlargement of the maximum hold-down clamp force can be observed in the comparison of the A1-K1-A1 and the A2-K1-A2 variants. It is known from the aluminium alloy of type AA8079 that this has a relatively low solidification in the case of plastic strain. This effect appears to favour the maximum achievable results in the cross tool tests. The combination of an aluminium alloy layer of type AA6016 with an aluminium alloy AA8079, so the A2-K1-A2 variant, showed an enormous increase of the hold-down clamp forces to over 600 kN even in the case of an enlargement of the circular blank diameter to 200 mm, despite a greater flow stress ratio in comparison to the A1-K1-A1 variant. At the time, the explanation of this result is seen in that the solidification of the outer aluminium alloy layer of type AA8079 is lower than that of the core material during the plastic deformation and that hereby the flow of the material is favoured during the forming procedure.

Figure 7:
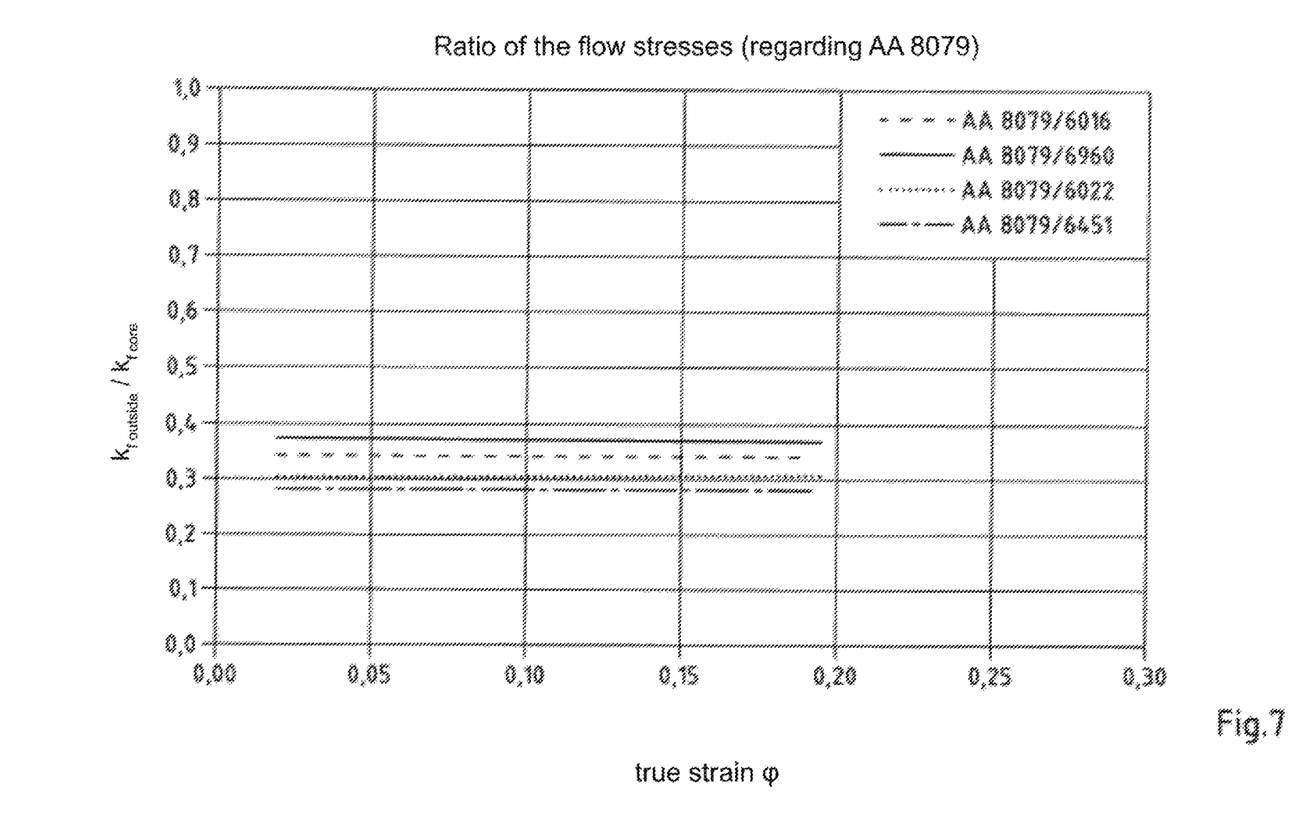
FIG. 7 is a diagram, the flow stresses of the material AA8079 depending on the strain in relation to the flow stress of different possible core alloys of type AA6xxx.

FIG. 7 shows the ratios of the flow stresses $k_{f,outside}$ of an outer aluminium alloy layer of type AA8079 in relation to the flow stresses of different conceivable core alloys of type AA6xxx. All variants have a ratio of $k_{f,outside}/k_{f,core}$ of less than 0.5. Thus it can be expected that such combinations of AA6xxx core alloys established in the automobile industry having an outer aluminium alloy layer of type AA8079 also have the distinctive improvement of the formability referred to above.

Figure 8:
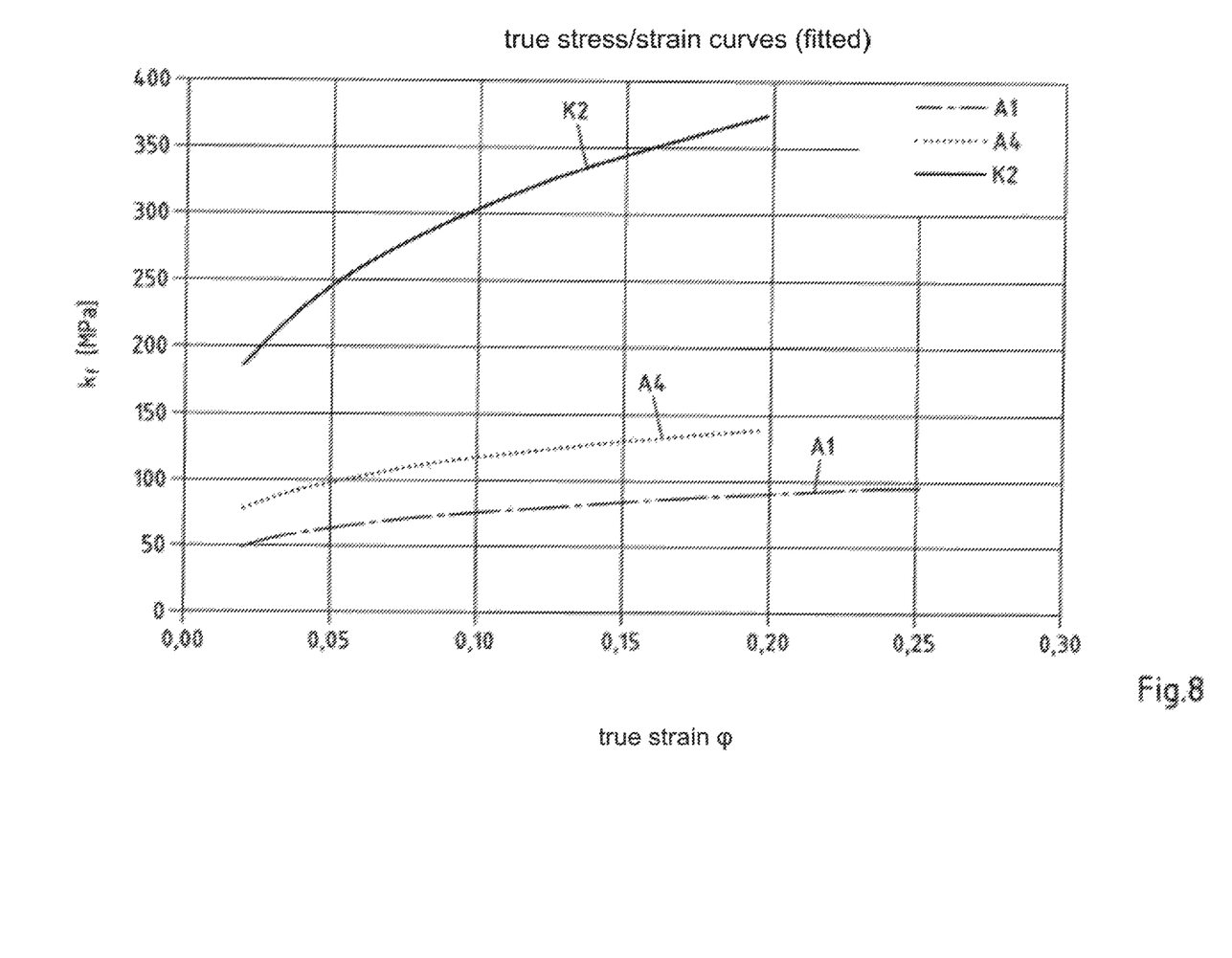
FIG. 8 is a diagram, flow stresses $k_f$ depending on the strain for the materials AlMg6, AA1050, AA5005.
Figure 9:
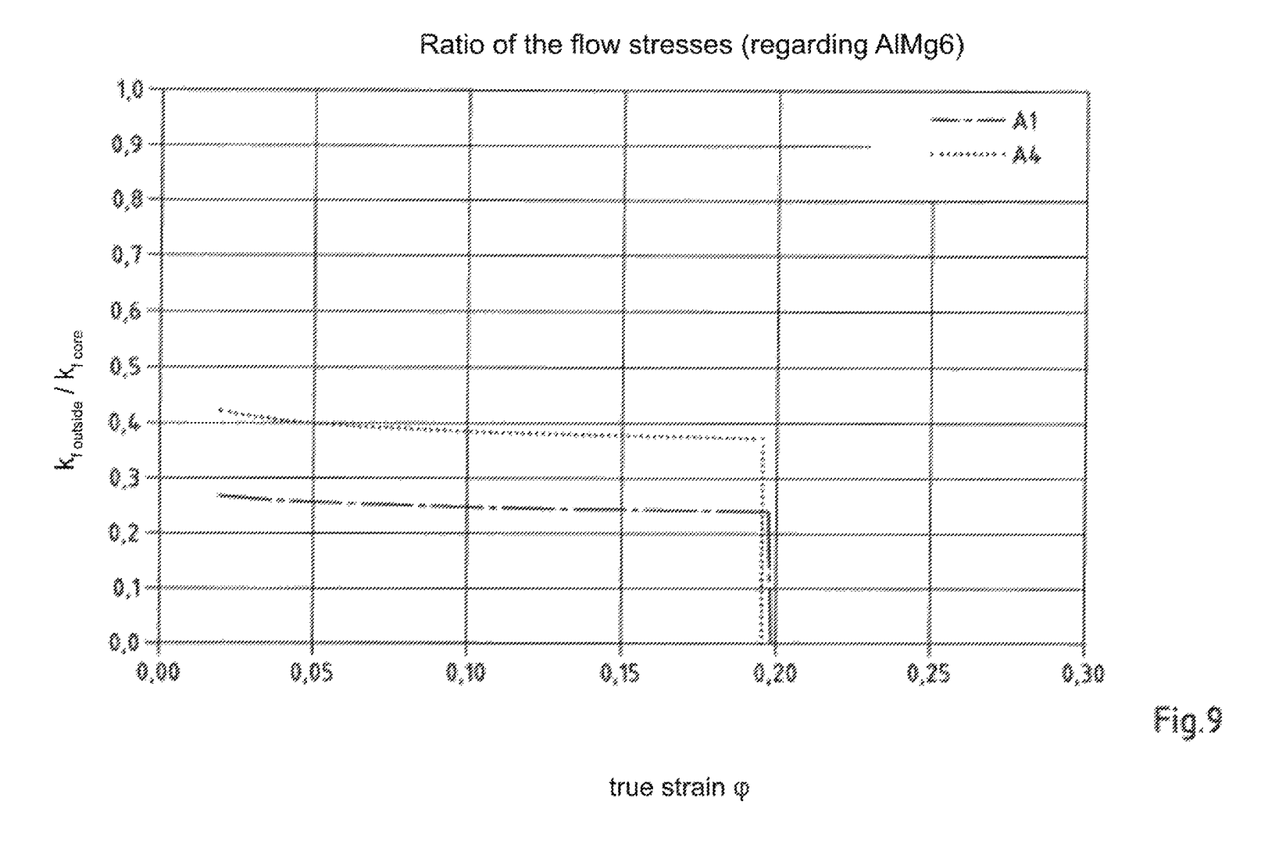
FIG. 9 is a diagram, the flow stresses of the materials AA1050, AA5005 depending on the strain in relation to the flow stress of the aluminium material AlMg6.

Similar results could also be achieved for another core alloy of type AlMg6, the stress-strain curves of which are depicted in comparison to the A3 and A4 variants in FIG. 8 in a diagram. FIG. 9 in turn shows the ratio of the flow stresses of the outer aluminium alloy layers A3 and A4 in relation to the core aluminium alloy layer of type K2. Both aluminium composite materials showed a maximum hold-down clamp force of more than 600 kN at a circular blank diameter of 195 mm, whilst the unclad comparison material K2 already showed tears at a circular blank diameter of 195 mm and a maximum hold-down clamp force of 75 kN.

Figure 10:
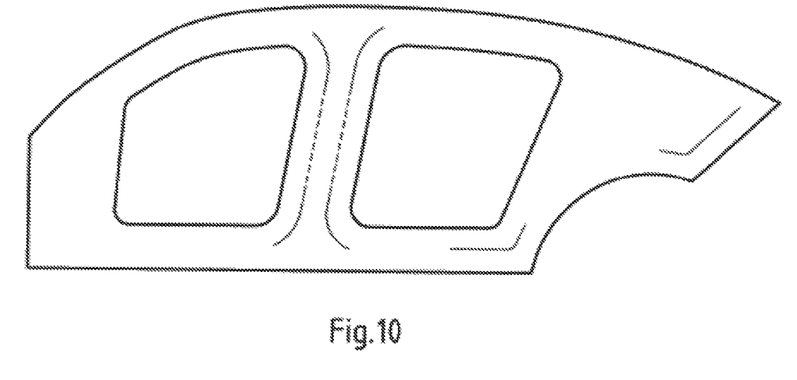
FIGS. 10 and 11 are two exemplary embodiments of sheet metal parts according to the invention.
Figure 11:
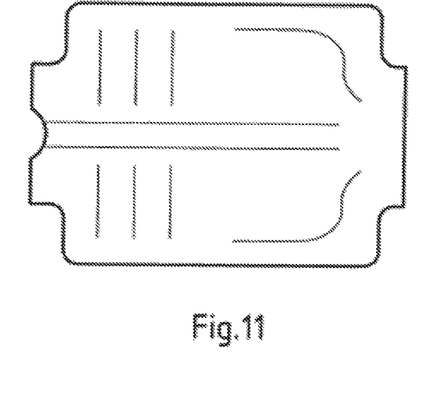

From these results it is clear that a considerably increase of the forming performance is enabled by skilful selection of the aluminium core alloy and the outer aluminium alloy layer. The enormous increases with regard to the forming performance which are accompanied by selection of the aluminium composite materials in connection with the forming method according to the invention enable large sheet metal parts, such as, for example, the side wall part of a motor vehicle depicted in FIG. 10 or also the floor pan of a motor vehicle depicted in FIG. 11 by way of example, to be able to be formed in one piece from a metal sheet consisting of an aluminium composite material formed using the method according to the invention.

Preferably, components produced according to the method according to the invention are, for example, visible outer skin parts of a body of a motor vehicle, in particular side wall parts, exterior door parts and exterior tailgate parts as well as bonnets, etc. of a motor vehicle which are produced with an aluminium core alloy of type AA6xxx. In addition, preferably all other structural and chassis parts, such as interior door parts, floor pans, etc., which are not visible and likewise require a very high degree of forming for an economic production, are produced with an aluminium core alloy of type A5xxx, for example with an AA5182 aluminium core alloy.

The invention claimed is:

1. Sheet metal part manufactured by forming an aluminium composite material which has a core alloy made from an aluminium alloy of type AA5xxx or AA6xxx and at least one outer aluminium alloy layer provided on one or both sides, wherein the aluminium composite material is formed in a forming tool and the outer aluminium alloy layer provided on one or both sides has a yield strength $R_{p0.2}$ of 25 MPa to 60 MPa in the soft or solution-annealed state, characterised in that, $$k_{f,outside}/k_{f,core} < 0.5$$

for the flow stresses of the aluminium alloys of the core and of the at least one outer layer in the soft or solution-annealed state, the frictional shear stress $\tau_R$ between the tool and the aluminium composite material in the contact surface reaches the shear flow stress $k_{outside}$ of the outer aluminium alloy layer at at least one local position in the forming tool during the formation of the aluminium composite material.

2. Sheet metal part according to claim 1, characterised in that, the forming comprises a deep drawing or stretch forming procedure.

3. Sheet metal part according to claim 1, characterised in that, at least one outer aluminium alloy layer having a thickness of 5% to 15% of the total aluminium composite material is formed.

4. Sheet metal part according to claim 1, characterised in that, the frictional shear stress $\tau_R$ is enlarged during the formation by an increase of the surface pressure between the aluminium composite material and the hold-down clamp.

5. Sheet metal part according to claim 1, characterised in that, an aluminium core alloy of type AA6xxx or AA5xxx is formed which has a uniform strain $A_g$ of at least 20% in the solution-annealed or soft state.

6. Sheet metal part according to claim 1, characterised in that, an alloy of type AA6xxx is used as an aluminium core alloy and an aluminium alloy of type AA8xxx is used as at least one outer aluminium alloy layer or an alloy of type AA5xxx is used as an aluminium core alloy and an aluminium alloy of type AA8xxx, AA1xxx, AA5005, AA5005A is used as at least one outer aluminium alloy layer.

7. Sheet metal part according to claim 6, characterised in that, an aluminium core alloy of type AA6016 and at least one outer aluminium alloy layer of type AA8079 is used.

8. Sheet metal part according to claim 1, characterised in that, an aluminium core alloy of type AlMg6 and at least one outer aluminium alloy layer of type AA8079, AA1050 or AA5005 or AA5005A is used.

9. Sheet metal part according to claim 1, characterised in that, an aluminium composite material having an AA6xxx aluminium core alloy having a thickness of 0.5 mm to 2.0 mm or an aluminium composite material having an AA5xxx aluminium core alloy having a thickness of 0.5 mm to 3.5 mm is formed.

10. Sheet metal part according to claim 1, characterised in that, the sheet metal part is a structural part or an outer skin part of a motor vehicle.

11. A deep drawn or stretch formed structural part or outer skin part of a motor vehicle formed with a method for forming an aluminium composite material which has a core alloy made from an aluminium alloy of type AA5xxx or AA6xxx and at least one outer aluminium alloy layer provided on one or both sides, the method comprising forming the aluminium composite material in a forming tool wherein the outer aluminium alloy layer provided on one or both sides has a yield strength $R_{p0.2}$ of 25 MPa to 60 MPa in the soft or solution-annealed state, wherein, $$k_{f,outside}/k_{f,core} < 0.5$$

applies for the flow stresses of the aluminium alloys of the core and of the at least one outer layer in the soft or solution-annealed state, the frictional shear stress $\tau_R$ between the tool and the aluminium composite material in the contact surface reaches the shear flow stress $k_{outside}$ of the outer aluminium alloy layer at at least one local position in the forming tool during the formation of the aluminium composite material and the formation comprises a deep drawing and/or stretch forming procedure and wherein an alloy of type AA6xxx is used as an aluminium core alloy and an aluminium alloy of type AA8xxx is used as at least one outer aluminium alloy layer or an alloy of type AlMg6 is used as an aluminium core alloy and an aluminium alloy of type AA8079, AA1050, AA5005, AA5005A is used as at least one outer aluminium alloy layer.

* * * * *